(12) United States Patent
Liu

(10) Patent No.: US 7,035,453 B2
(45) Date of Patent: Apr. 25, 2006

(54) METHOD AND APPARATUS FOR PARALLEL MULTI-VIEW POINT VIDEO CAPTURING AND COMPRESSION

(75) Inventor: Ping Liu, Vancouver (CA)

(73) Assignee: Reality Commerce Corporation, Calgary (CA)

( * ) Notice: Subject to any disclaimer, the term of this patent is extended or adjusted under 35 U.S.C. 154(b) by 519 days.

(21) Appl. No.: 10/239,414

(22) PCT Filed: Mar. 23, 2001

(86) PCT No.: PCT/IB01/00676

§ 371 (c)(1),
(2), (4) Date: May 12, 2003

(87) PCT Pub. No.: WO01/72052

PCT Pub. Date: Sep. 27, 2001

(65) Prior Publication Data
US 2003/0169627 A1   Sep. 11, 2003

Related U.S. Application Data

(60) Provisional application No. 60/191,754, filed on Mar. 24, 2000.

(51) Int. Cl.
*G06K 9/00* (2006.01)

(52) U.S. Cl. ............... 382/154; 382/238; 375/240.12; 715/757

(58) Field of Classification Search ............... 382/107, 382/154, 232, 238, 284, 294; 345/419, 427; 348/220.1, 255; 375/240.02, 240.12; 715/757, 715/806, 781; 707/10, 104.1; 358/1.15, 358/448, 909.1
See application file for complete search history.

(56) References Cited

U.S. PATENT DOCUMENTS

| | | | | |
|---|---|---|---|---|
| 5,617,334 A | * | 4/1997 | Tseng et al. | 708/203 |
| 5,703,961 A | * | 12/1997 | Rogina et al. | 382/154 |
| 6,084,979 A | * | 7/2000 | Kanade et al. | 382/154 |
| 6,124,862 A | * | 9/2000 | Boyken et al. | 345/419 |
| 6,327,381 B1 | * | 12/2001 | Rogina et al. | 382/154 |
| 6,420,698 B1 | * | 7/2002 | Dimsdale | 250/234 |
| 6,445,807 B1 | * | 9/2002 | Katayama et al. | 382/100 |

* cited by examiner

Primary Examiner—Sheela Chawan
(74) Attorney, Agent, or Firm—Sughrue Mion, PLLC

(57) ABSTRACT

A method and apparatus for digital video capturing and compression supports multi-viewpoint interactive video applications. Multiple (typically hundreds of) video cameras centripetally placed in a three dimensional space acquire real-time visual pictures of the same 3D scene from multiple viewpoints at the rate of 20~30 frames per second (fps). Parallel Multi-Viewpoint Video Capturing and Compression (PMVCC) supports the operation of the apparatus. In an exemplary realization, a Multi-DSP Array (MDA) architecture uses hundreds of high-performance digital signal processors (DSPs) working in parallel to obtain a sustained computation power of hundreds of GIPS (Giga Instructions Per Second).

24 Claims, 14 Drawing Sheets

Repeat 4 once                Repeat 4 twice

Before hardware calibration

After hardware calibration

Algorithm: PMVCC I Frame Encoding

Step 1. Encode $C_{XY}$, the frame from C-camera.

- Step 1.1. Decompose $C_{XY}$ into eight equivalent, non-overlap parts. Six parts are sent to the six S-processors and two parts to the C-processor.
- Step 1.2. For all seven processors, encode in parallel, the eight parts of $C_{XY}$ using suitable still-image coding scheme.
- Step 1.3. All seven processors send their respective part of compressed $C_{XY}$ to subsystem data bus as the output of this PG-7 group.

Step 2. Feedback loop.

- Step 2.1. For all seven processors, decode in parallel, the respective part of the compressed $C_{XY}$.
- Step 2.2. All S-processors send their respective part of decoded data to C-processor. Then the C-processor assembles and broadcasts a complete $C_{XY}$ to all S-processors in the group (Cross-processor data exchange) such that every processor in the group receives a complete copy of reconstructed $C_{XY}$.

Step 3. Encode $S_{XY}$, the frame from S-cameras.

- Step 3.1. For all six S-processors, make the rotation and translation prediction for $S_{XY}$ based on reconstructed $C_{XY}$ and camera parameters.
- Step 3.2. For all six S-processors, take the difference between actual $S_{XY}$ and predicted $S_{XY}$.
- Step 3.3. For all six P-processors, encode the difference using suitable still-image coding algorithm.
- Step 3.4. For all six P-processors, send the encoded difference to subsystem bus as the group output.

Figure 16.

Algorithm: PMVCC P Frame Encoding

Step 1. Encode $C_{XY}$, the frame from C-camera.

Step 1.1. Decompose $C_{XY}$ into eight equivalent, non-overlap parts. Six parts are sent to the six S-processors and two parts to the C-processor. Margins required for motion estimation are also sent to each processor.

Step 1.2. For all seven processors, encode in parallel, the eight parts of $C_{XY}$ using suitable predicted-frame coding scheme.

Step 1.3. All seven processors send their respective part of compressed $C_{XY}$ to subsystem data bus as the output of this PG-7 group.

Step 2. Feedback loop.

Step 2.1. For all seven processors, decode in parallel, the respective part of the compressed $C_{XY}$.

Step 2.2. All S-processors send their respective part of decoded data to C-processor. Then the C-processor assembles and broadcasts a complete $C_{XY}$ to all S-processors in the group (Cross-processor data exchange) such that every processor in the group receives a complete copy of reconstructed $C_{XY}$.

Step 3. Encode $S_{XY}$, the frame from S-cameras.

Step 3.1. For all six S-processors, make the rotation and translation prediction for $S_{XY}$ based on reconstructed $C_{XY}$ and camera parameters.

Step 3.2. For all six S-processors, take the difference between actual $S_{XY}$ and predicted $S_{XY}$.

Step 3.3. For all six P-processors, encode the difference using suitable still-image coding algorithm.

Step 3.4. For all six P-processors, send the encoded difference to subsystem bus as the group output.

Figure 17.

| Slot 7 | Slot 8 | Slot 1 | Slot 2 | Slot 3 | Slot 4 | Slot 5 | Slot 6 |
|---|---|---|---|---|---|---|---|
| C-Recv $C_{xr}(7)$; C-Encd $C_{xr}(7)$; C-Send $C'_{xr}$ | C-Recv $C_{xr}(8)$; C-Encd $C_{xr}(8)$; C-Send $C'_{xr}$ | $S_1$-Recv $C_{xr}(1)$; $S_1$-Encd $C_{xr}(1)$; $S_1$-Send $C'_{xr}(1)$ | $S_2$-Recv $C_{xr}(2)$; $S_2$-Encd $C_{xr}(2)$; $S_2$-Send $C'_{xr}(2)$ | $S_3$-Recv $C_{xr}(3)$; $S_3$-Encd $C_{xr}(3)$; $S_3$-Send $C'_{xr}(3)$ | $S_4$-Recv $C_{xr}(4)$; $S_4$-Encd $C_{xr}(4)$; $S_4$-Send $C'_{xr}(4)$ | $S_5$-Recv $C_{xr}(5)$; $S_5$-Encd $C_{xr}(5)$; $S_5$-Send $C'_{xr}(5)$ | $S_6$-Recv $C_{xr}(6)$; $S_6$-Encd $C_{xr}(6)$; $S_6$-Send $C'_{xr}(6)$ |
| $S_6$-Decd $C'_{xr}(6)$; $S_6$-Send $\underline{C}_{xr}(6)$ | C-Decd $C'_{xr}(7)$; C-Send $\underline{C}_{xr}(7)$ | C-Decd $C'_{xr}(8)$; C-Send $\underline{C}_{xr}(8)$ | $S_1$-Decd $C'_{xr}(1)$; $S_1$-Send $\underline{C}_{xr}(1)$ | $S_2$-Decd $C'_{xr}(2)$; $S_2$-Send $\underline{C}_{xr}(2)$ | $S_3$-Decd $C'_{xr}(3)$; $S_3$-Send $\underline{C}_{xr}(3)$ | $S_4$-Decd $C'_{xr}(4)$; $S_4$-Send $\underline{C}_{xr}(4)$ | $S_5$-Decd $C'_{xr}(5)$; $S_5$-Send $\underline{C}_{xr}(5)$ |
| $S_5$-Predict & code difference $D_5$; $S_4$-send $D'_4$ | $S_6$-Predict & code difference $D_6$; $S_5$-send $D'_5$ | $S_6$-send $D'_6$ | $S_i$-Recv $\underline{C}_{xr}$ for $i=1\sim 6$ | $S_1$-Predict & code difference $D_1$ | $S_2$-Predict & code difference $D_2$; $S_1$-send $D'_1$ | $S_3$-Predict & code difference $D_3$; $S_2$-send $D'_2$ | $S_4$-Predict & code difference $D_4$; $S_3$-send $D'_3$ |

- Notation:
  — C: C-processor
  — $S_i$: The i-th S-processor
  — $C_{xr}(j)$: The j-th tile of $C_{xr}$
  — $C'_{xr}(j)$: The j-th encoded tile of $C_{xr}$
  — $\underline{C}_{xr}(j)$: Reconstructed $C_{xr}(j)$
  — D: residual data from difference operation
  — D': encoded difference
  — Recv: Receive
  — Encd: Encode
  — Decd: Decode
- Time Slot length: $(1/30 \sim 1/20)/8$ second = $4.16 \sim 6.25$ ms
- Data transfer time for 1/8 original image = $(640 \times 480 \times 1.5)/20$ Mbyte = 2.8 ms
- Maximum Processing Capacity in one group: $7 \times 1{,}600$ MIPS = 11,200 MIPS
- Estimated Effective Processing Capacity in one group: 11,200 MIPS*(40%~60%)=4,480~6,720 MIPS depending on the algorithm implementation

Figure 18.

METHOD AND APPARATUS FOR PARALLEL MULTI-VIEW POINT VIDEO CAPTURING AND COMPRESSION

CROSS REFERENCE TO RELATED APPLICATIONS

This is a National stage entry under 35 U.S.C. § 371 of Application No. PCT/IB01/00676 filed Mar. 23, 2001, which claims the benefit of U.S. Provisional Application No. 60/191,754 filed Mar. 24, 2000, the above noted prior applications are all hereby incorporated by reference.

This application claims the benefit of U.S. Provisional Application No. 60,191,754 filed Mar. 24, 2000, the disclosure of which is herein incorporated by reference in its entirety.

This application is related to the copending application by Yonghui Ao, filed on the same date as the present application, entitled "METHOD AND SYSTEM FOR SUBJECT VIDEO STREAMING". This related application will be hereinafter referred to as the Subject Video Streaming application.

BACKGROUND OF THE INVENTION

1. Field of the Invention

The invention relates in general to the field of digital video capturing and compression, and particularly to real-time multi-viewpoint video capturing and compression. The data output by this apparatus can be used to serve a plurality of simultaneous viewers with different interests in the same 3D scene or object. Therefore, this technology can be used for such interactive video applications as E-commerce, electronic catalog, digital museum, interactive entertainment, and the like.

2. Description of the Related Art

The need for and the technological development of multi-viewpoint image or video capturing technologies have been around for many years. The history can be traced even back to the 19th Century when people attempted to take simultaneous photos of a running horse from different angles. When combined with modern electronics and digital technologies, however, new challenges arise.

Consider a typical digital video camera that takes color images of 512×512 pixels in size at a refresh rate of 30 frames per second (fps). Consider further a set of, for example, 200 or more such cameras working synchronously, producing over 200 concurrent digital video streams. This amounts to a raw data rate of about 20 Gbit/s. If the standard MPEG-2 scheme is used for video compression, a total of more than 200 MPEG-2 threads must be handled simultaneously. This would demand the computational power of hundreds of Giga-instructions per second, or GIPS (i.e., units of $10^9$ instructions per second). Such a raw data rate and such a level of computation power are far beyond the capability of any single or multiple digital signal processors existing today at a commercially feasible cost. Take, for example, the Texas Instruments (TI) C8x processors. Even the powerful multiple DSP like TI C8x (5 DSP cores in a chip with 2000 MIPS power at the cost of US $1,000/ea) cannot handle one channel of MPEG-2 processing. If two C80xs or eight C6xs are used to serve one camera, the total cost is too high, considering that 200 or more cameras must be served, and the system will be too large to be practically implemented. Even though the processing power of seven C6x DSPs is sufficient to handle one MPEG2 compression and decompression, it takes ⅔ (22.4 ms) of the processing time to transmit a frame of raw data (640×480 color) to co-processors for parallel computing. It is impractical to do so for a 30 fps (33.33 ms/frame) real time video application, and thus represents a system bottleneck.

The technical challenge for such a system includes (1) handling massive video capturing and compression tasks, (2) handling a huge amount of raw data traffic from multiple video cameras to multiple image processors, and (3) producing a compressed code stream significantly smaller than the traffic of 200 MPEG-2 code streams.

Conventional multi-viewpoint image and video capturing/coding techniques follow a model-based approach. The basic idea behind these techniques is that, by utilizing the visual information acquired from a plurality of cameras, a 3-D model can be established. The transmission of the data relating to the 3D model, as opposed to transmitting the data relating to the actual object or scene, is a manageable amount. A typical procedure in the model-based approach includes the steps of (1) acquiring multi-viewpoint raw video data; (2) analyzing the raw video data to establish a 3-D shape description of the scene or of the objects in the scene; (3) encoding the 3-D model and associated descriptions (e.g., texture) into a compact form.

Some 3D camera products have been commercialized. These cameras detect the depth information relating to the object being shot via an active-radar-like process, and return 3-D shape information about the object. Since they can record the visible surface from only one viewpoint, several such cameras are needed from different viewpoints to establish a complete description. A multi-viewpoint variation of these 3-D cameras is 3-D scanner. In general, a 3-D scanner is not suitable for capturing dynamic events, in which the visual world is in motion even while the image capturing is taking place.

The 3D Dome Project (see A Multi-Camera Method for 3D Digitization of Dynamic, Real-World Events, P. Rander doctoral dissertation, tech. report CMU-RI-TR-98- 12, Robotics Institute, Carnegie Mellon University, May, 1998. referred to hereinafter as the dome project article) of the Robotics Institute of Carnegie Mellon University is perhaps the first integration of synchronized cameras at multiple viewpoints. It is a typical model-based method, where the 3D shape and appearance over time need to be estimated. In particular, the 3D digitization method in the dome project article decomposes the 3D shape recovery task into the estimation of a visible structure in each video frame followed by the integration of the visible structure into a complete 3D model. Then, this estimated 3D structure is used to guide the color and texture digitization in the original video images. The 3D dome itself consists of a synchronized collection of 51 calibrated video cameras mounted on a geodesic dome 5 m in diameter. This 3D Dome design has an inherent difficulty in performing integrated, on the fly, real-time capturing and coding due to the large amount of data and the complexity of the model computation task.

In another work (see "Acquiring 3D Models of Non-Rigid Moving Objects From Time and Viewpoint Varying Image Sequences: A Step Toward Left Ventricle Recovery", Y. Sato, M. Moriyama, M. Hanayama, H. Naito, and S. Tamura, IEEE Transactions on Pattern Analysis and Machine Intelligence, Vol. 19, No. 3, March 1997.), Y. Sato et al described a method for the accurate recovery of time-varying 3D shapes with a known cycle from images with different viewpoints as well as times. This is also a model-based approach, aiming at the recovery of the left ventricular shapes.

U.S. Pat. No. 5,850,352 (issued Dec. 15, 1998, to Moezzi et al.) describes an immersion video system. This is also a model-based approach. It includes a "hypermosaicing" process to generate, from multiple video views of a scene, a three-dimensional video mosaic. In this process, a knowledge database is involved which contains information about the scene such as scene geometry, shapes and behaviors of objects in the scene, and internal/external camera calibration models. For video capturing, multiple video cameras are used, each at a different spatial location to produce multiple two-dimensional video images of the scene. Due to the high complexity of the 3-dimensional scene model computation, this method is unlikely to be capable of producing a real-time code stream construction integrated with the capturing task.

U.S. Pat. No. 5,617,334 (issued Apr. 1, 1997 to Tseng et al.) describes a method for multi-viewpoint digital video coding and decoding. This method describes a hybrid model-based and MPEG-like compression scheme. The encoder comprises a depth estimator which combines the information from a few video channels to form a depth map of the scene or of the object. The depth map itself is to be encoded and sent to the decoder. The encoded information also includes MPEG-2 coded prediction errors. This method deals with the case in which there is only 1 primary viewpoint and a few (four in the description) dependent viewpoints, and does not provide a solution for situations with a massive number (hundreds) of viewpoints. Besides, since the processing speed is not a main concern in that work, no parallel and distributed processing scheme is described.

There are several drawbacks to the model-based approach. First, extracting a 3D model from multi-viewpoint images is not guaranteed always to be successful and accurate, and is normally very time-consuming. It is not suitable for large-scale, real-time, processing. Second, displaying a recovered 3D model with the associated texture mapped on it will not always reconstruct the original object precisely. In particular, the visual differences between the picture taken directly from the camera and the picture rendered from the graphics model will often be great.

SUMMARY OF THE INVENTION

One of the objects of this invention is to provide a method and system in no 3D model needs to be extracted. According to the invention, the pictures taken will be compressed without attempting to understand the geometry structure of the object. With the observation that pictures taken from two close viewpoints will be similar for most of the cases, this spatial redundancy will be exploited in the inventive video compression algorithm. This will eliminate both the uncertainty of 3D model extraction and the visual errors of rendering the images from a graphics model.

In an apparatus employing the inventive method according to an embodiment of the invention, the apparatus includes a shell structure placed on a preferably flat platform, which isolates the space underneath the shell from the outside world. This shell can be constituted using such 3-D geometric shapes as sphere, dome, polyhedral, or cubic, and has a dome structure (hemisphere) in a specific embodiment. The platform can, but need not necessarily, be made rotatable by connecting it with a motor. The space underneath the hemisphere and above the platform is the visual world to be processed by this apparatus.

Such an apparatus with integrated real-time digital video capturing and compression capability is referred to herein, for the sake of linguistic convenience, as an Integrated Digital Dome (IDD). The invention further relates to a method of parallel multi-viewpoint video capturing and compression (PMVCC) to support the operation of such an IDD. In an exemplary embodiment of PMVCC according to the invention, a Multi-DSP Array (MDA) architecture is employed, with hundreds of high-performance DSPs working in parallel to obtain a rate of computation of 300 GIPS at a commercially feasible cost. By means of MDA, the real time video data are compressed on the fly by the IDD. Multi-viewpoint compressed data are sent to a host system (a video server or a personal computer) in a proprietary format for future processing. Such processing is described in the Subject Video Streaming application.

The PMVCC algorithm according to the invention provides for parallelism. In this algorithm, only about 15% of the viewpoints are to be dealt with by full MPEG2 compression, and the images of other viewpoints are coded in a highly compact form by utilizing the spatial similarity of these images with the base images.

Other objects, advantages, and aspects of the invention will become apparent from the discussion below, taken in accordance with the included drawings.

BRIEF DESCRIPTION OF DRAWINGS

FIG. 16 shows, in high level natural language pseudocode, an I-frame coding algorithm according to an embodiment of the invention.

FIG. 17 shows, in high level natural language pseudocode, a P-frame coding algorithm according to an embodiment of the invention.

FIG. 18 illustrates a task pipeline structure for a program group in accordance with an embodiment of the invention.

DETAILED DESCRIPTION OF THE PREFERRED EMBODIMENTS

Constructional Design of the Apparatus

Figure 1:
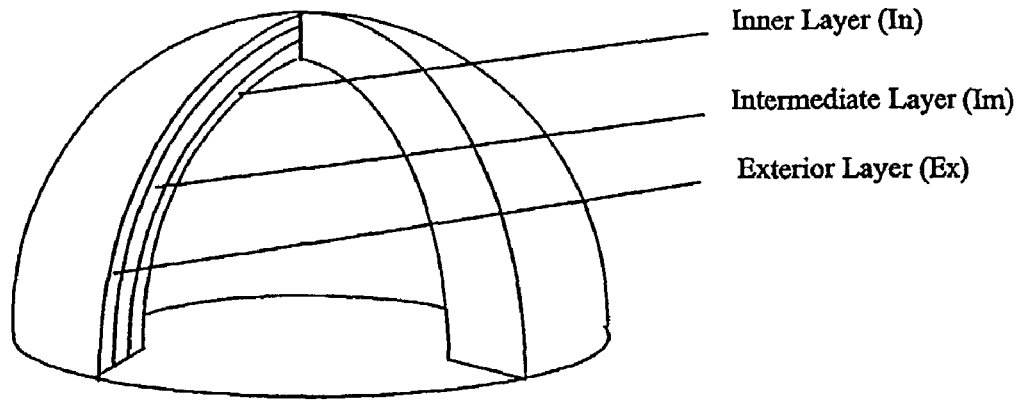
FIG. 1 shows, in highly simplified form, a three layer structure relating to an embodiment of the invention.

A description will now be provided for the sake of conveying a complete understanding of how best to practice and implement the invention. It will be appreciated, however, that the discussion will include numerous specificities which are not strictly necessary to the invention and may be varied or omitted. Some detail is omitted as necessary to avoid obscuring the invention. The scope and reach of the invention should be understood in conjunction with the appended claims.

An apparatus according to the invention can be constituted in various shapes, and the method according to the invention does not favor any particular one of the shapes. From a practical point of view, many applications prefer an isotropic design such that the optical center from different viewpoints coincides at a common point, and that the picture-taking process at different viewpoints possesses the same focal length. Such a preference suggests a cover-like structure where the surface of the viewpoints forms a hemisphere or similar shape. Without loss of generality, the description herein will be based on such a dome-like structure throughout the rest of this document. It will be understood, however, that "dome" is used for linguistic convenience only and should be viewed as a term meaning any appropriate shape. The terms "cover" or "container" may also be used, and it will be understood that these terms are meant to have a meaning identical to that of "dome" as described above.

The size of the cover is flexible. Typical embodiments include desktop dimensions with volumes large enough to contain objects like toys, tools, electronics, etc.; room dimensions capable of containing larger objects such as vehicles, furniture, animals, or human models; stadium dimensions capable of hosting mass gathering such as sports or entertainment activities.

In a particular embodiment, the cover is defined to have three functional layers: an inner layer (In), an intermediate layer (Im), and an exterior layer (Ex).

The function of the In-layer is to provide the background and illumination for the visual world. The illumination design and material used for the In-layer are not specified in this invention, but should fulfill the requirement that the peeking is one-way available only from outside to inside of the cover. In other words, the outside world is invisible for a viewer inside the cover, but the outside viewer is able to peek and view the scene inside.

The Im-layer contains a plurality of video sensors for capturing the digital video data. In an embodiment, more than 200 CCD cameras are placed centripetally on the Im-layer. Their locations are determined following a certain mosaic structure. These video cameras acquire real-time visual pictures from multiple viewpoints at the rate of 20~30 fps. The captured digital video data are real-time compressed by a plurality of digital signal processors through a method as described below.

The Ex-layer provides the physical frame and wiring for inter-connection between the cover and other equipment. A subsystem module is included in the Ex-layer that transmits the captured video data to mass storage equipments or computing processors for further processing.

FIG. 1 illustrates the three-layer structure of the IDD. In an embodiment, the diameter of the cover is around three meters.

Determining Viewpoints

A plurality of CCD cameras is placed in the Im-layer, with the camera head pointing towards inside of the IDD. Each camera represents a viewpoint of observation.

Figure 2:
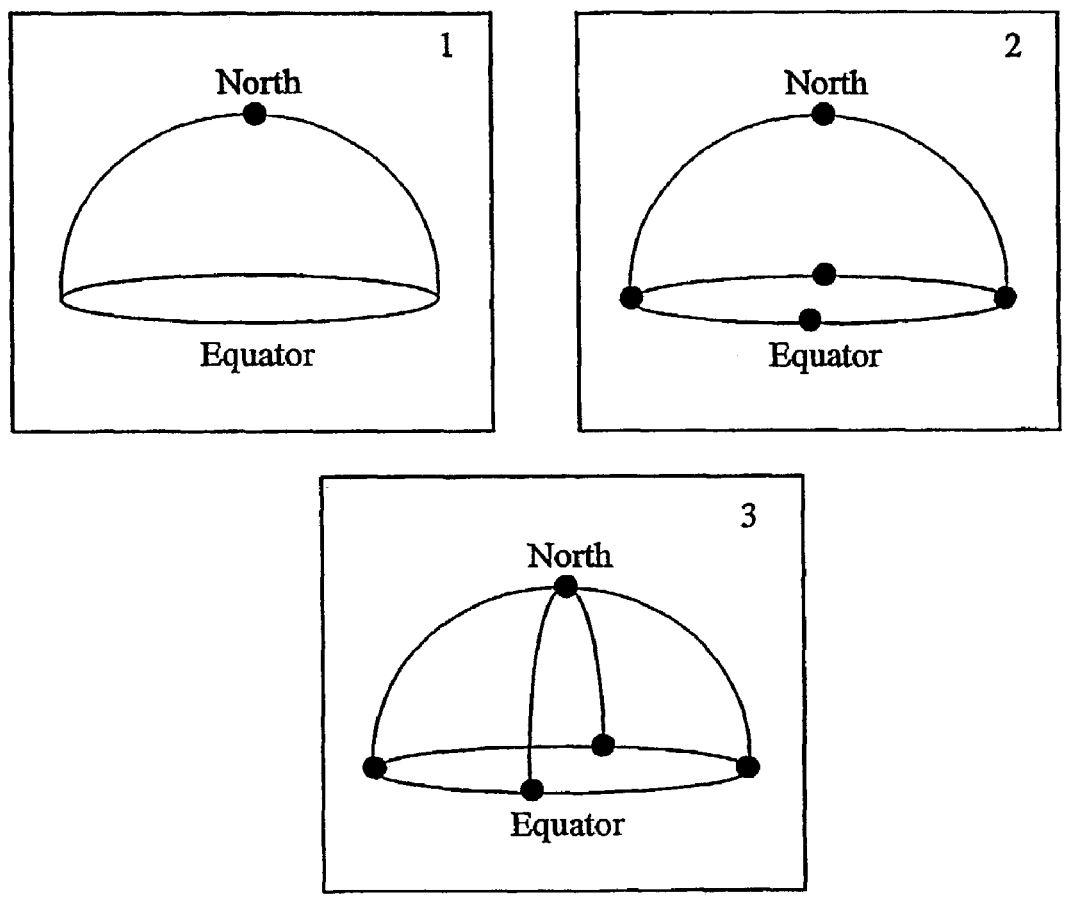
FIG. 2 graphically illustrates the determination of the location and number of viewpoints on the dome.

The invention has no favored preference on the numbers and locations of the viewpoints on the cover. The invented method applies equally to various choices of camera number and viewpoint location. A typical configuration is latitude-longitude system with two sets of perpendicular geodesic lines and each viewpoint being defined at every cross point of the geodesic lines. In an embodiment, the location and number of viewpoints on the cover is determined as follows:

Step 1. Divide the surface of cover into four equal parts (FIG. 2).
1. Locate the North Pole of the cover.
2. Dividing the equator into four equal segments. The four dividing points are denoted as $D_0$, $D_1$, $D_2$, and $D_3$.
3. From each of the four dividing points, draw a shortest arc connecting to north pole. These four arcs divide the surface of cover into four equal parts (quarters).

Figure 3:
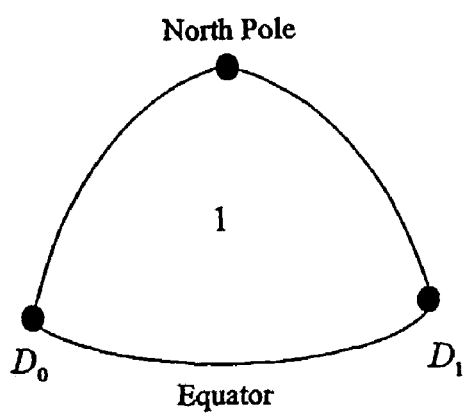
FIG. 3 graphically illustrates a particular step in the determination of the location and number of viewpoints on the cover.
Figure 3:
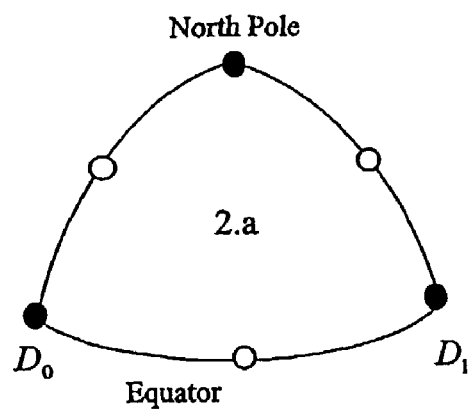
Figure 3:
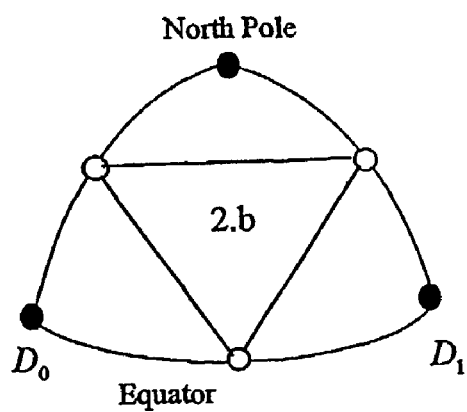
Figure 3:
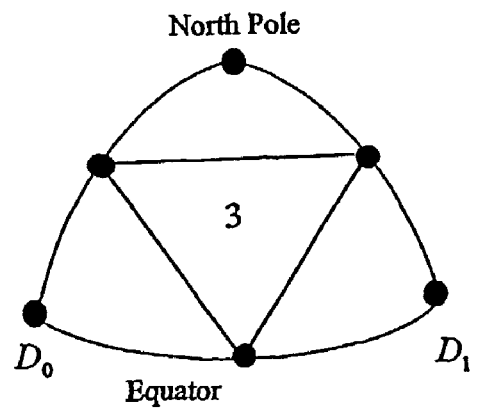
Figure 3:
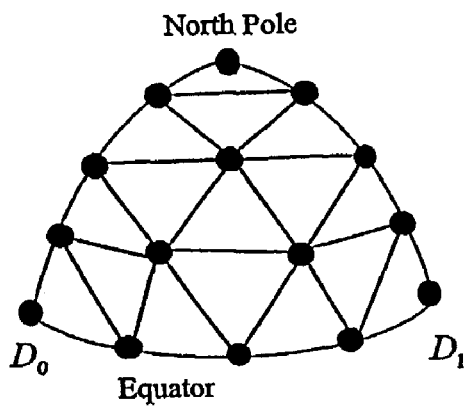
Figure 3:
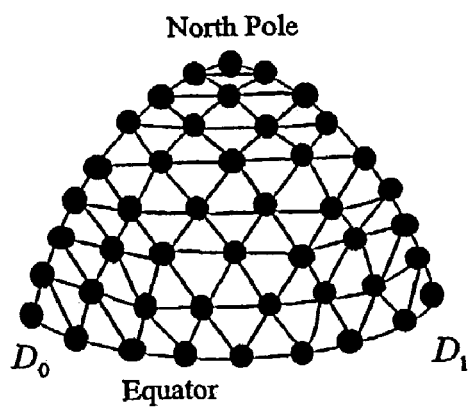

Step 2. For each quarter (without loss of generality, we consider the quarter of $D_0$–$D_1$), do the following (FIG. 3):
1. Define S to be a set of sphere triangles. Initialize S to contain the sphere triangle defined by vertices $D_0$, $D_1$, and the North Pole.
2. For every sphere triangle in S do
3. Find the middle point on every arc connecting a pair of vertices.
4. Connect all these middle points using the shortest arc.
5. Turn all middle points into new vertices. Delete all sphere triangles in S, and then fill S with all new sphere triangles.
6. Repeat 2 and 3.

In practice, Step 2.4 can be repeated an arbitrary number of times. After each repeat, each vertex on the cover represents a viewpoint. Therefore, the number of repetitions determines the density of viewpoints. In an embodiment we require the Step 2.4 be repeated at least two times. Therefore, in that embodiment, the number of viewpoints on the cover is at least 146.

Camera Calibration

At each viewpoint there is a digital video camera (e.g., CCD or CMOS camera) pointing towards the inside of the cover. For every camera there are two operation modes: recording mode and calibration mode. The camera parameters are fixed during the recording mode but are adjustable during the calibration mode.

Figure 4:
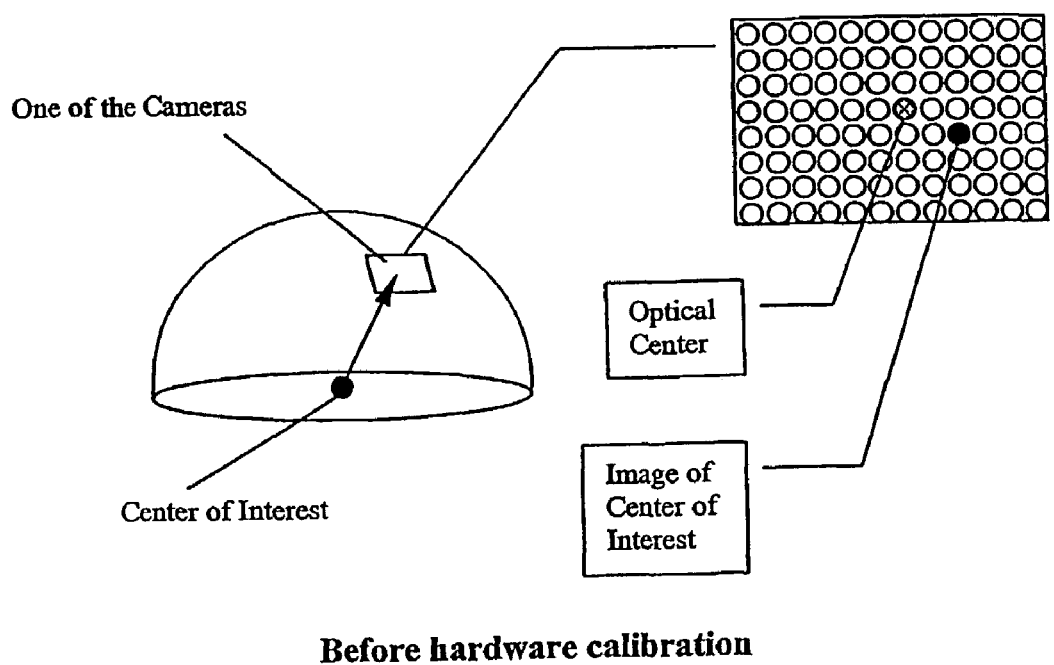
FIG. 4 is an explanatory figure relating to the hardware calibration process.
Figure 4:
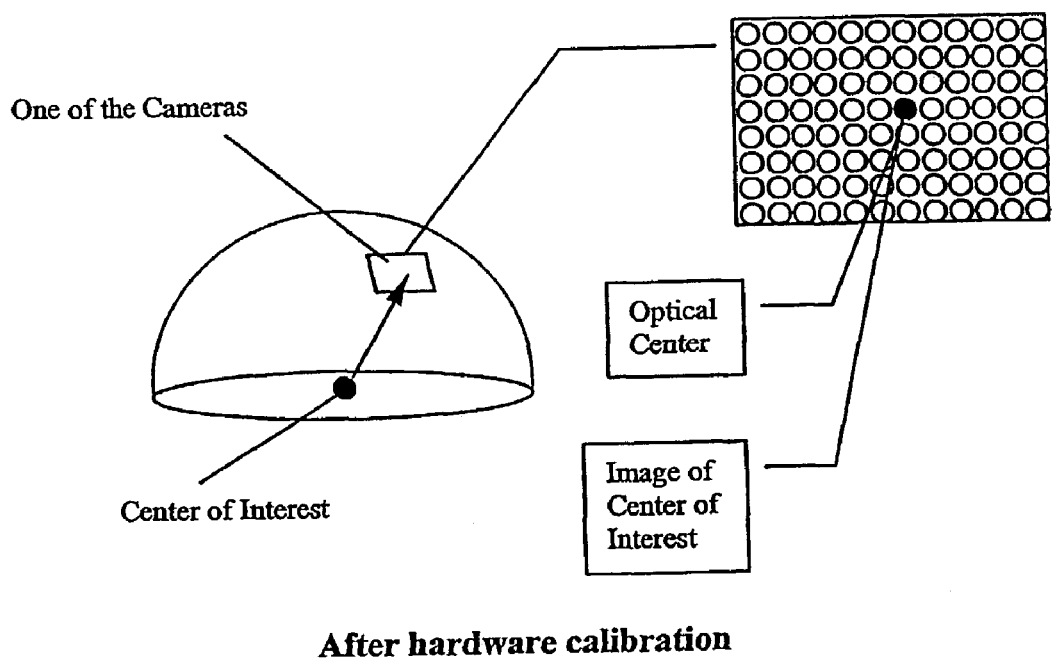

There are two basic methods for camera calibration: hardware calibration and software calibration. The hardware calibration process assures that the optical center of all cameras coincidences with the same Center of Interest (without loss of generality let it be the center of the cover), as shown in FIG. 4. This process can be done manually or automatically, individually for every camera. The hardware calibration process also assures that all cameras have the same focal length which is adjusted such that the Center of Interest has the sharpest image on the image plane.

Figure 5:
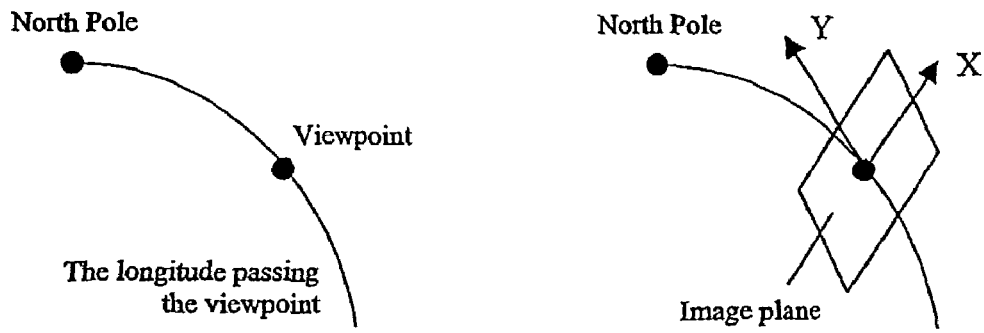
FIG. 5 is an explanatory figure illustrating the determination of a coordinate system.

The hardware calibration process further determines the X-Y coordinate system on the 2-D image plane (FIG. 5). In an embodiment the Center of Interest is coincident with the center of the cover. In this circumstance the image plane is coincident with the tangential plane of the cover at the viewpoint. The Y (vertical) axis is the projection of the line of longitude that passes this viewpoint onto the image plane, with the North being the positive direction. The X-axis is perpendicular to Y-axis on the image plane with East being the positive.

Figure 6:
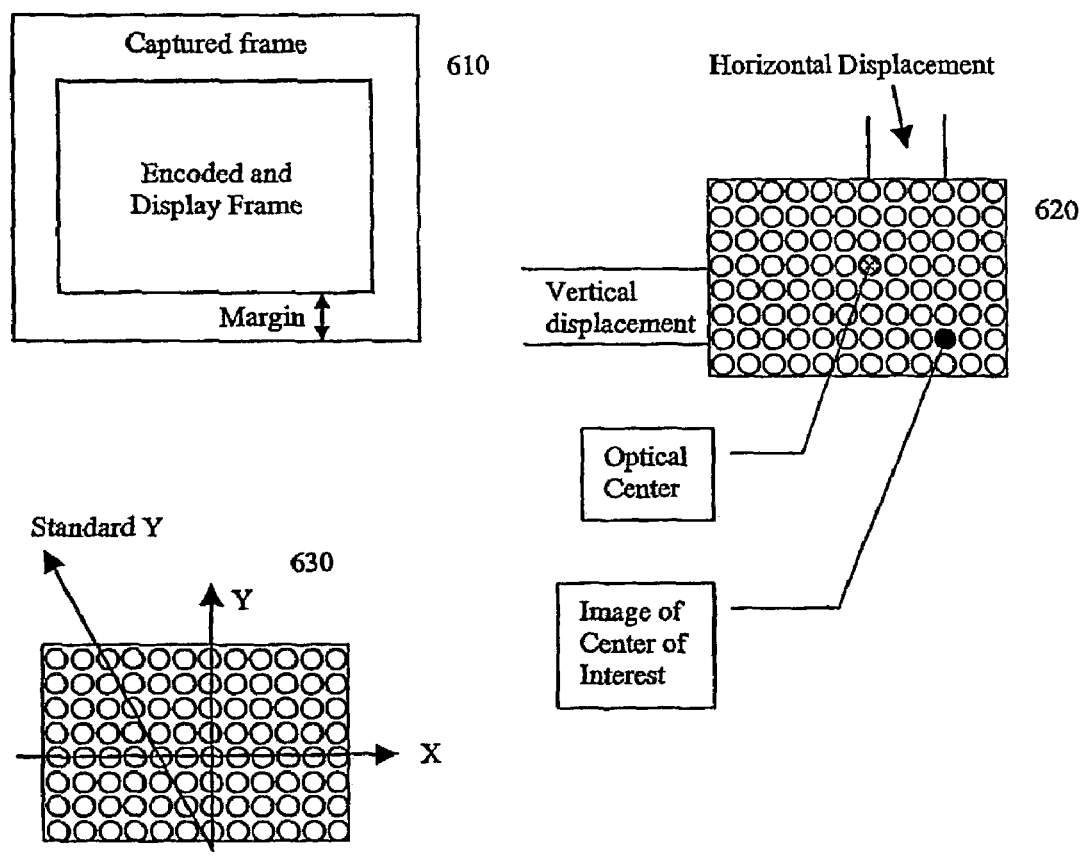
FIG. 6. graphically illustrates the calibration of the software.

In software calibration (FIG. 6), the basic idea is not to physically adjust the camera parameters to the standard values, but to record the difference between the camera parameter values before calibration and the standard values. These difference values are then compensated during the video coding process. In a preferred embodiment, we let the captured frame size be slightly larger than the encoding and display frame size (610), so that there is a margin in both the horizontal and vertical directions, respectively. For example, one may use a camera with 500×500 pixels resolution and define a 384×256 area in the center to be the actual frame to be encoded and displayed. When a cover is produced, the initial mechanical work on mounting the cameras at the viewpoints should meet such a precision that the maximum displacement of the optical center from the image of center of interest should not exceed the size of margin (620). The displacements in the vertical and horizontal directions are recorded during software calibration and are used in the encoding process.

The software calibration further measures the angular difference between the Y-axis on the image plane and the standard Y direction which is the image plane projection of the longitude that passes the viewpoint (630).

Video Capturing

A central clock is used to control the synchronous picture taking from all viewpoints. The recording mode includes single-shot recording and continuous recording. In single-shot recording, only one image is taken simultaneously at each viewpoint. In continuous recording, a sequence of pictures is taken synchronously at each viewpoint. In continuous mode, the rate of the central clock determines the frame rate of the video.

Captured digital video signal can be either in R-G-B format or Y-U-V format. In the former case, an extra step is needed to convert it into Y-U-V format, which is a standard process. U and V data are further down-sampled by a standard 4:1:1 or 4:2:0 format depending on the application, and are transferred to a plurality of digital signal processors (DSP) for coding.

Processing Groups (PG)

Figure 7:
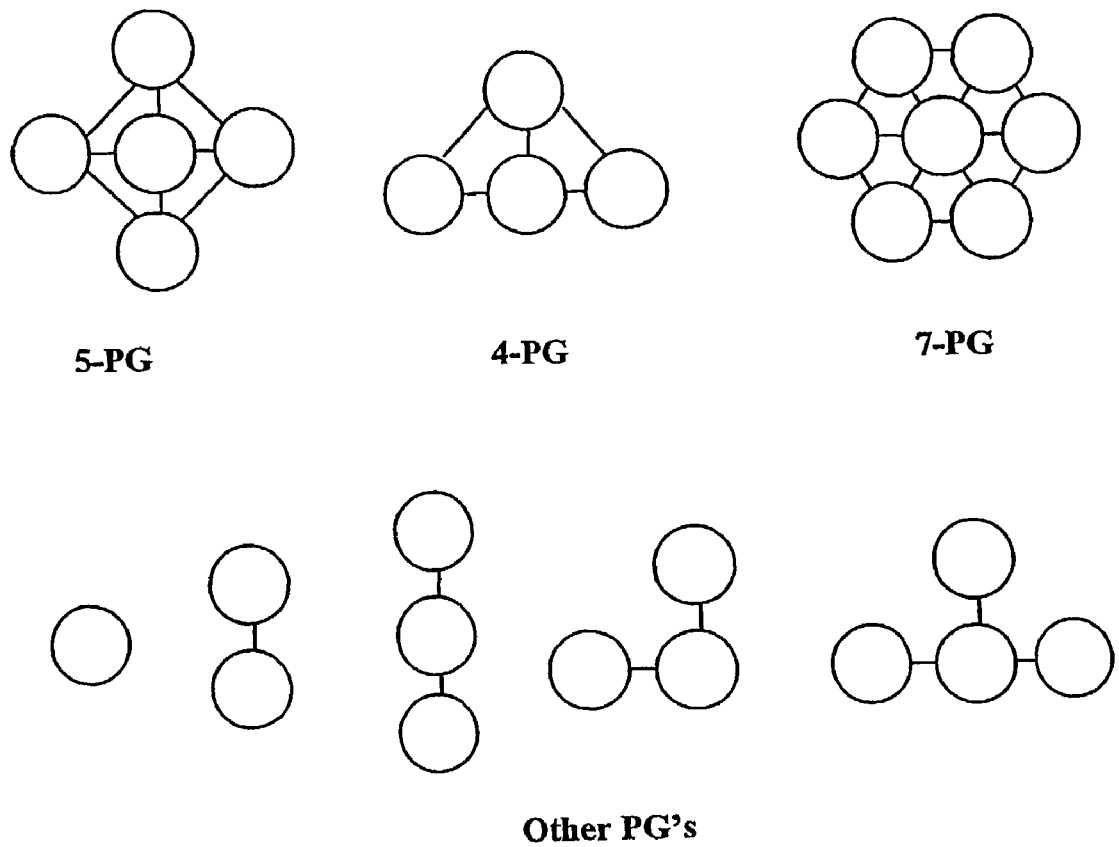
FIG. 7. shows different types of processing groups.

Video coding is performed using the processing group (PG) as a unit. The assignment of each viewpoint to an appropriate processing group and the number of viewpoints in a processing group are entirely up to the designer and can be flexible. In a preferred embodiment four types of PG are developed (FIG. 7):

- PG-5. This PG type has 5 cameras: a generally central camera (referred to generically as "control camera" or "C-camera") and 4 surrounding cameras (S-cameras). This PG type is used at the North Pole viewpoint.
- PG-4. In this type of PG there are one C-camera and three S-cameras. This type of PG is used at viewpoints $D_0$, $D_1$, $D_2$, and $D_3$.
- PG-7. This type of PG contains a C-camera and six S-cameras.
- Irregular PG. This type of PG contains a C-camera and none or up to three S-cameras.

This invention does not specify a scheme of using these PGs. However, it can been seen that with these four types of PG all the viewpoints on the cover can be exactly covered (no overlap or missing). The following description relates to the PG-7, but the same principle may be applied to any of the other types of PGs.

The PG-7 in Detail

Figure 8:
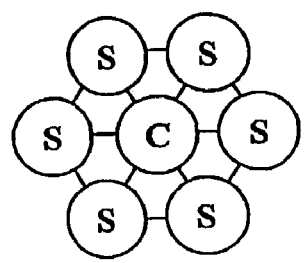
FIG. 8 illustrates the logic relationships and physical positions among cameras and processors in a processing group.

Associated with every viewpoint there is a DSP processor. FIG. 8 illustrates the logic relationships and physical positions among the seven video cameras and DSP processors in a PG-7 group. The C-processor serves as a group master to control the whole compression process of the PG, including sub-task pipeline synchronization, bus control, data collection, and data distribution. It also undertakes 25% of coding sub-tasks. The S-processors are co-processors each of which takes 12.5% of coding sub-tasks.

Figure 9:
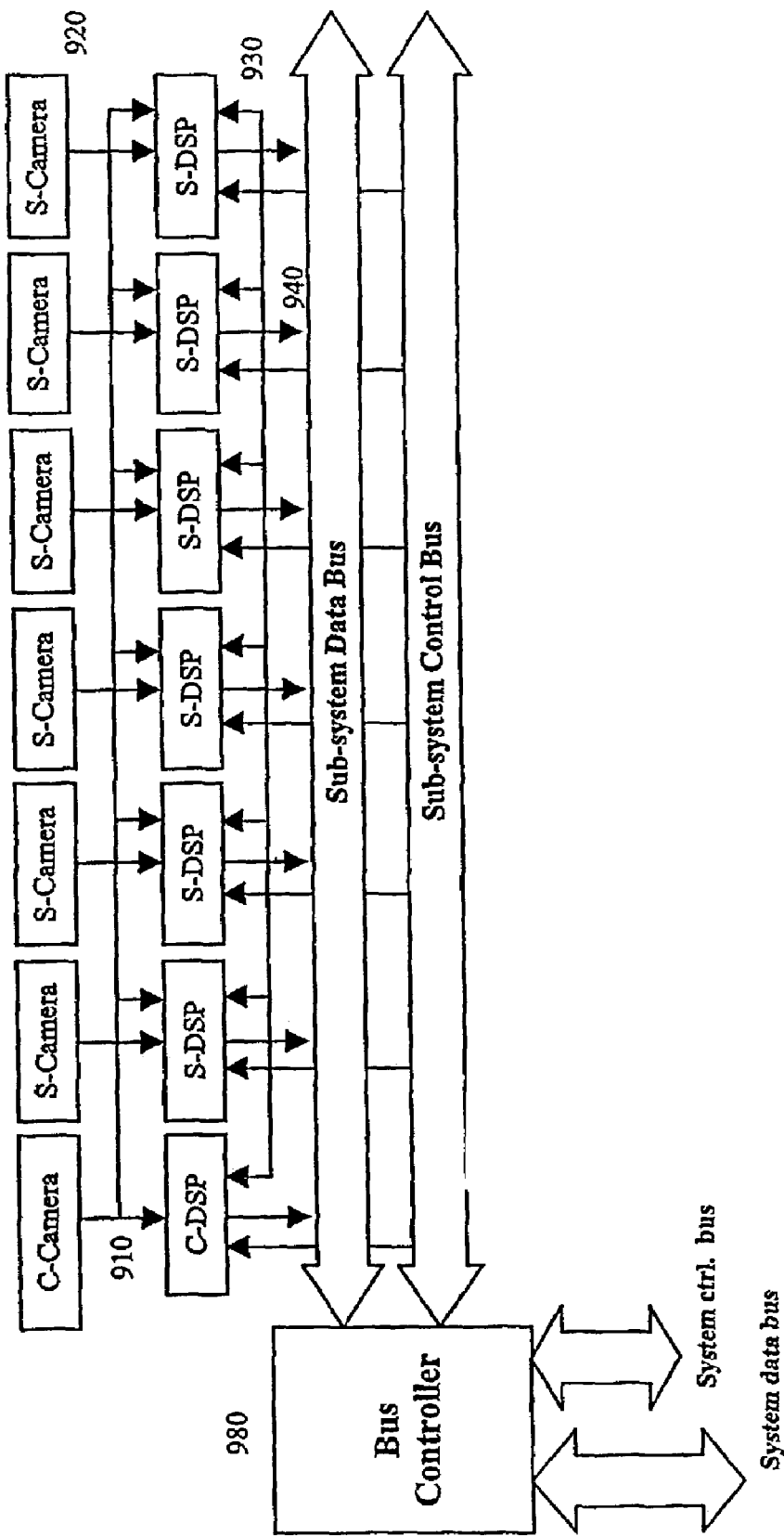
FIG. 9 is a simplified block diagram of the processing group shown in FIG. 8.

FIG. 9 is the block diagram of a processing group PG-7 corresponding to FIG. 8. A bus controller (980) is added to improve bus-driving ability and synchronization with other PGs. Raw digital data (in Y-U-V format) from the C-camera is distributed to all seven DSP processors for coding (910). In contrast, raw digital data from each S-camera is sent to the corresponding S-DSP processor only (920). During the coding process, mutual data exchange is required among the processors (930). Encoded data are placed on the sub-system data bus (940) to be sent to the host system.

Figure 10:
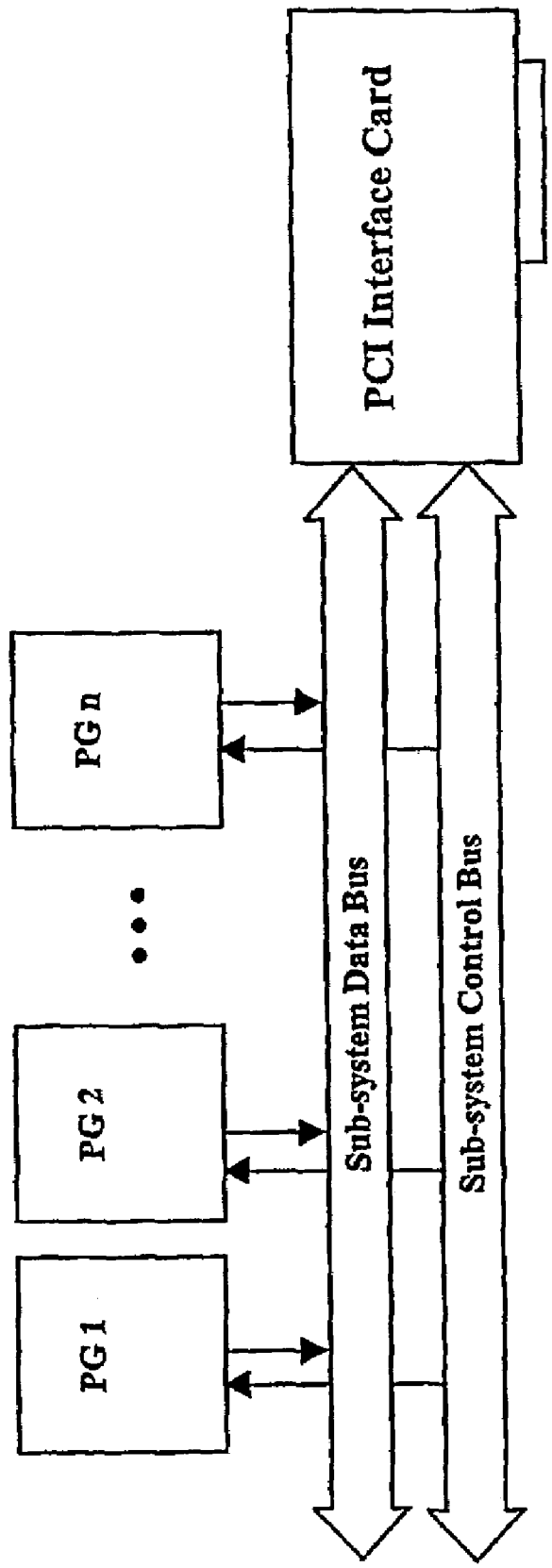
FIG. 10 is a highly simplified schematic showing the logical interrelationships between components of an entire capture and compression system.

FIG. 10 is a logic diagram of the entire PMVCC system organization. All the processing groups are connected with a system data bus and a system control bus that connect to the PCI Interface Card for outputting compressed video data to a host computer.

Figure 11:
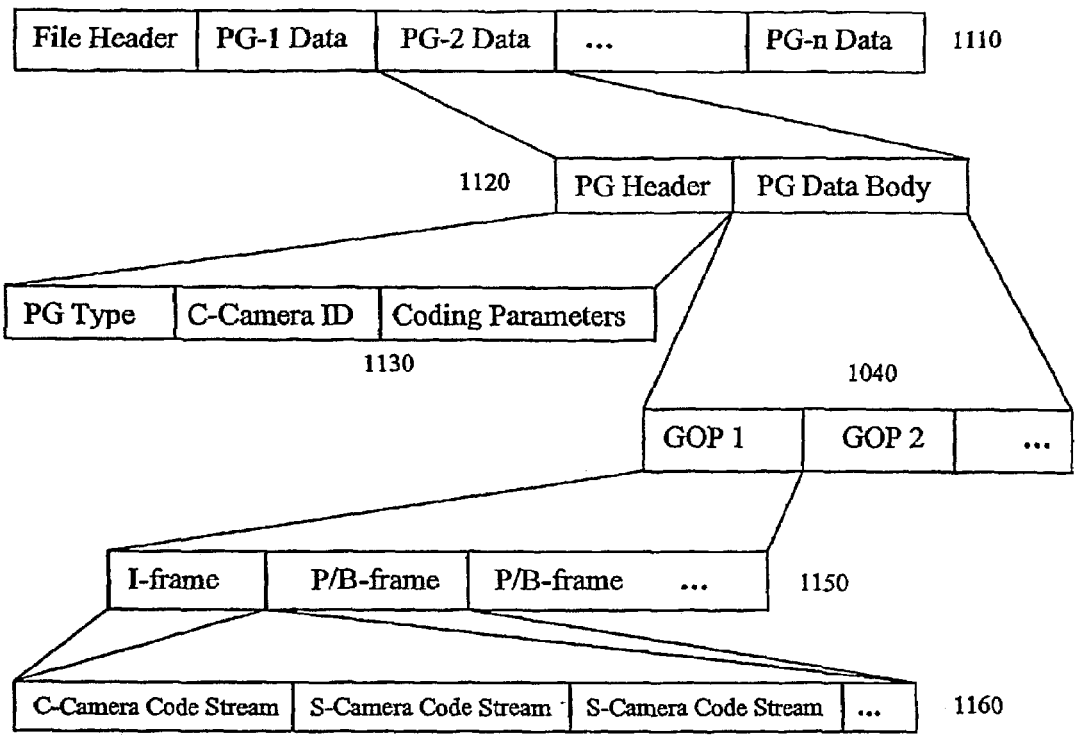
FIG. 11 illustrates the syntactic structure of a coded bitstream.

FIG. 11 illustrates the syntactic structure of the coded bitstream produced by the cover. At the top level of syntax (1110), the bitstream contains a file header followed by code streams of all PGs. There is no particular preference for the order of PGs, but in an embodiment we put the North PG first, and then the PGs at viewpoints $D_0$, $D_1$, $D_2$, and $D_3$. The file header contains generic information such as the frame size, frame rate, and so on. A PG code stream comprises the PG header and the PG data body (1120). The PG header (1130) specifies the type of PG (whether it is PG-3, PG-4, PG-7, or other types), the C-Camera ID, and coding parameters such as the color format being used, what kind of coding scheme is used for this PG, and so on. Note that different PGs of the same cover may be coded using different schemes, e.g., one using DCT coding and another using sub-band coding. It will be appreciated that in there is no regulation on how to assign the C-camera ID.

Each PG code stream contains a sequence of GOPs (group of pictures) (1140), similar to the MPEG family. A GOP contains a leading I-frame (independent frame) followed by a sequence of P-frames (predicted frame) or B-frames (bi-directional frame) (1150). In the rest of this document an embodiment with only I and P frames is described but the principle completely covers the situation with B frame. Both I and P frames possess the same bitstream structure, that is, a C-Camera code stream followed by up to six S-camera code streams (1160). Again, no restriction is required on the order of those S-camera code streams, and any convention may be employed.

Figure 12:
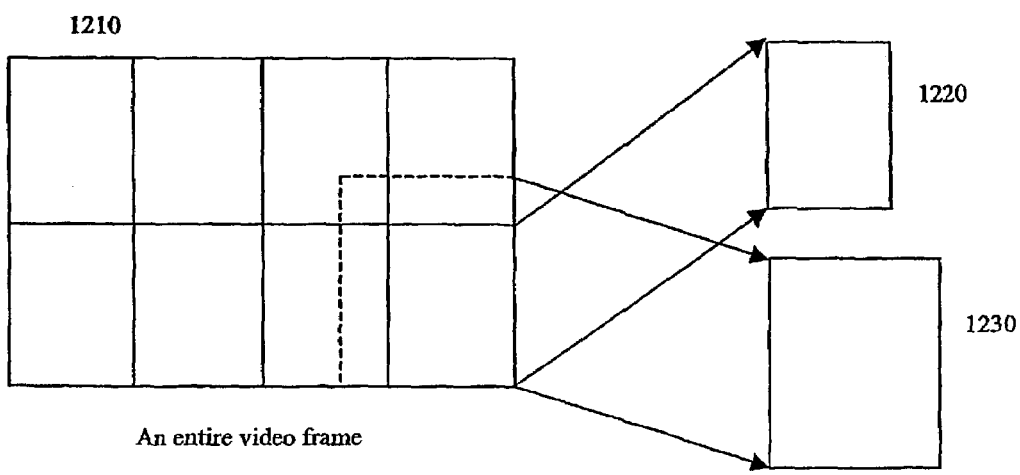
FIG. 12 illustrates coding task decomposition.

FIG. 12 illustrates the coding task decomposition in this PMVCC method. The entire video frame is divided into eight equal-sized tiles (1210). Each S-processor is responsible for the coding of one tile, and the C-processor deals with two tiles. There is no restriction on which tile is assigned to which processor. When coding an I-frame, only the exact tile is to be fed to a processor (1220). However, when coding a P-frame, the tile and a portion of the surrounding margin are to be transmitted to a processor in order to perform motion estimation. The size of the margin is determined by the size of the search window in a motion estimation algorithm (see below for details).

C-Processor

Figure 13:
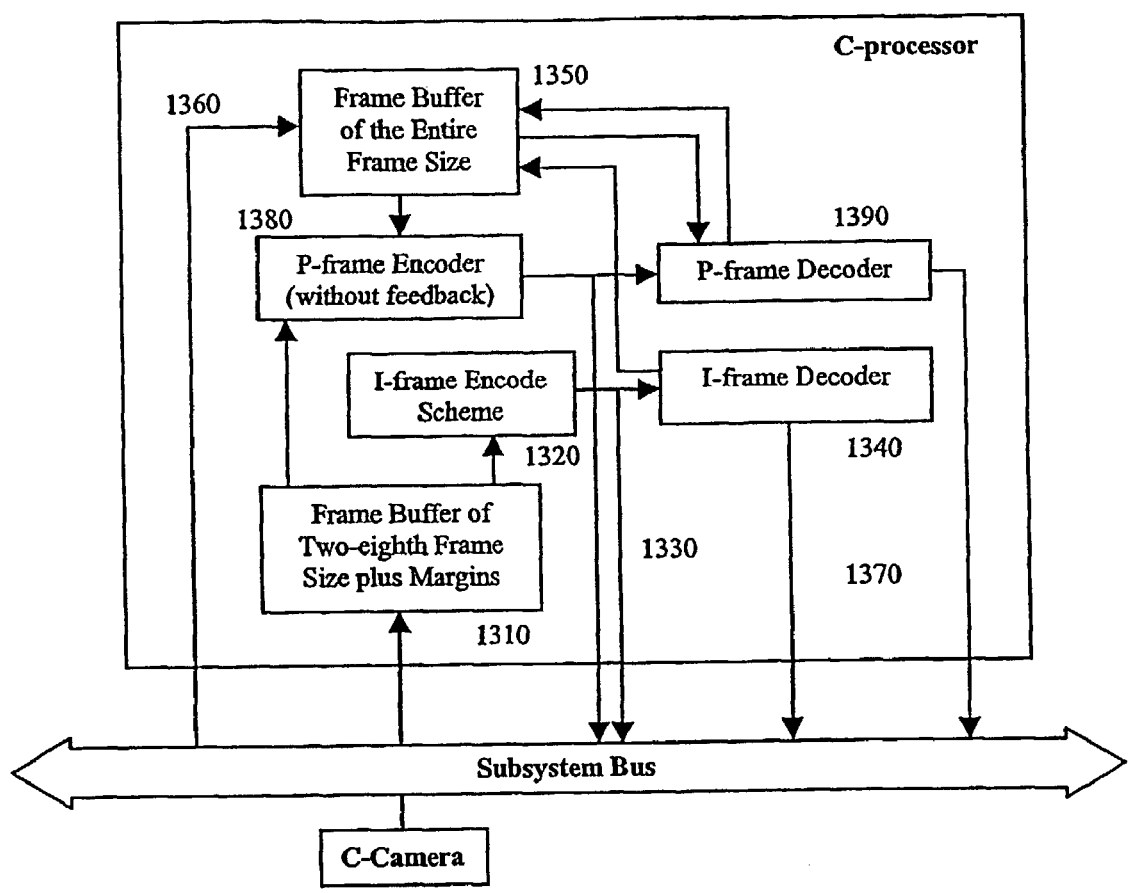
FIG. 13 shows the modular design and data flow in a C-processor according to an embodiment of the invention.

FIG. 13 shows the algorithm modular design and data flow in a C-processor. The C-processor receives raw data input from the C-camera only. In the case of I-frame coding, the exact two tiles chosen out of eight tiles from the entire video frame are input to a frame buffer (1310). In the case of P-frame coding, the two tiles chosen plus margins (1230) required for motion estimation are input to the frame buffer (1310). If the current frame is to be encoded as an I-frame, a suitable I-frame encoding scheme is called (1320). Here, "suitable I-frame coding scheme" refers to a standard JPEG-like coding scheme as used in the MPEG family for independent frame coding, or can be any proprietary coder that encodes a still image frame. The encoded I-frame data is put on the subsystem bus (1330) for output to the host system. Then a suitable I-frame decoder (an inverse process of the encoding) decodes the compressed data (1340). The decompressed data is sent to a frame buffer (1350) as a reference for coding a new P-frame. This frame buffer also receives decompressed data (1360) of other tiles from those S-processors in the same PG, to form a complete reconstructed frame. The decompressed data is also put on the subsystem bus (1370) for exchange with the S-processors within the same PG.

If the current frame is to be coded as a P-frame, the two tiles plus margins are fed to a suitable P-frame encoding scheme (1380). Here, a "suitable P-frame encoding scheme" refers to a standard MPEG-like P-frame coding scheme but without the feedback loop, or can be any proprietary P-frame coding routine without the feedback loop. The encoded P-frame data is put on the subsystem bus (1330) for output to the host system. Then a suitable P-frame decoder (an inverse process of the encoding) decodes the compressed data (1390). The decompressed data is sent to a frame buffer (1350) as a reference for coding the next P-frame. This frame buffer (1350) also receives decompressed data of other tiles from those S-processors in the same PG, to form a complete reconstructed frame. The decompressed data is also put on the subsystem bus (1370) for exchange with other processors within the same PG.

S-Processor

Figure 14:
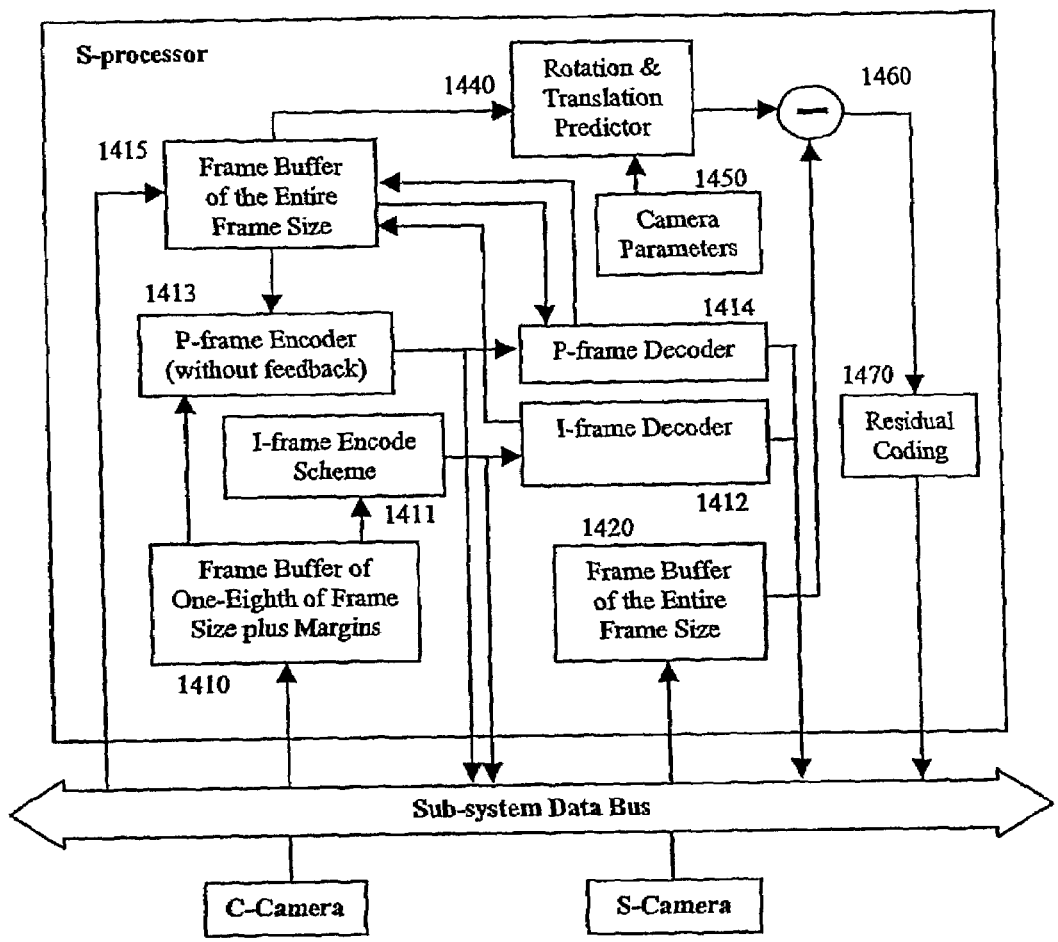
FIG. 14 shows the modular design and data flow in an S-processor according to an embodiment of the invention.

FIG. 14 shows the algorithmic modules and data flow in an S-processor. The S-processor receives raw data input from both its corresponding S-camera and the C-camera in the same PG. The description for modules 1410, 1411, 1412, 1413, 1414, and 1415 is the same as in the C-processor, except that only one tile instead of two is processed in this case.

The S-processor receives raw data from the S-camera at the same time instant that the C-camera raw data comes in. While the C-camera input is being processed, the S-camera data is buffered in a full size buffer (1420). Right when the reconstructed C-camera data is ready at 1415, a rotation and translation predictor (1440) is applied so as to form a prediction for the S-camera data in 1420. This prediction is done by rotating and translating the C-camera data according to the relationship between the S-camera image and the C-camera image as described by the camera parameters (1450). Essentially, the camera parameters include the viewpoint location of the S-camera, the X-Y coordinate system on the image plane, and in the case of software calibration, the displacement information. This set of information is acquired during camera calibration and is pre-loaded into the S-processor. The predicted S-camera image is compared with the actual S-camera image through a pixel-to-pixel difference (1460). The differences are finally encoded by a residual coding scheme (1470) to form a final code for S-camera image, which is placed on the subsystem bus for output to the host system. The residual coding scheme can be any type of still-image coding scheme, such as JPEG or sub-band coding.

Figure 15:
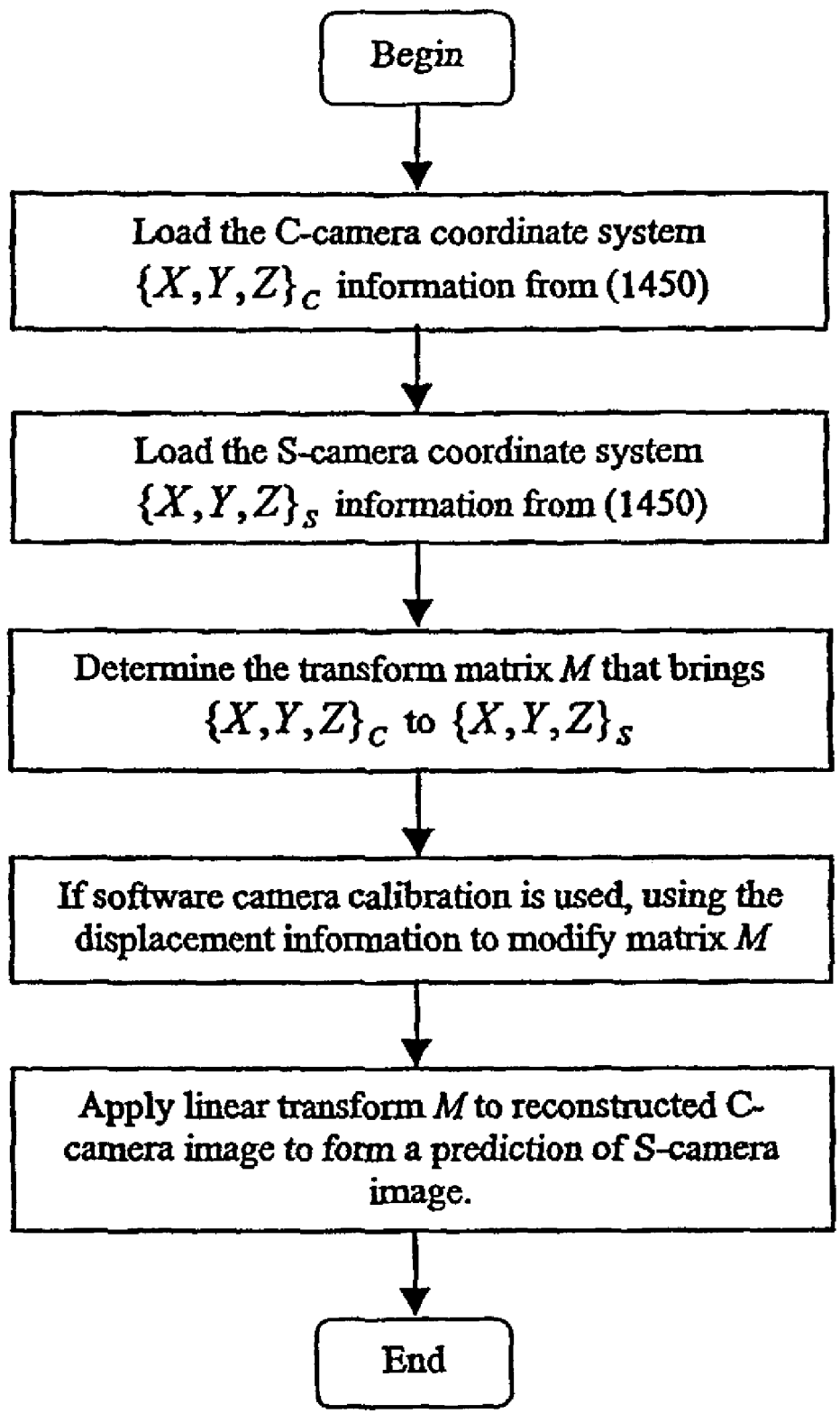
FIG. 15 is a logic diagram relating to rotation and translation prediction.

FIG. 15 illustrates a logic diagram of rotation and translation prediction used in (1440). It contains two steps. First, a linear transform matrix M is determined that brings the C-camera coordinate system to the S-camera coordinate system. If software camera calibration is used, then this matrix M should also consider the influence of the displacements of the two coordinate systems from their respective standard coordinates on the transform. The second step is to apply the matrix M to the reconstructed C-camera image to make a prediction for the S-camera image. The related mathematics is quite standard and the detail is omitted here so as not to obscure the invention.

PMVCC I-Frame Coding Algorithm

A complete description of an I-frame coding algorithm in PMVCC is given in FIG. 16. In this algorithm, seven DSP processors (one C-processor and six S-processors) work in parallel, producing a much faster encoding power than MPEG-like coding schemes. In this algorithm, "suitable still-image coding scheme" can be a standard JPEG-like coding scheme or any proprietary still-image coding scheme.

PMVCC P-Frame Coding Algorithm

FIG. 17 gives the P-frame coding algorithm in PMVCC. This is also a parallel encoding scheme among seven DSP processors. The process is similar to the PMVCC I-frame coding algorithm, except that at Step 1.2 an MPEG-like P-frame coding scheme is used instead of a JPEG-like scheme. It should be noted that, when the raw data from C-processor is split and sent to the seven processors, the relevant margins for motion estimation (refer to FIG. 12) are also sent.

Task Pipeline

The two PMVCC parallel algorithms (I-frame and P-frame) can be effectively pipelined. FIG. 18 illustrates an exemplary task pipeline structure of PG-7. It is a true MIMD array processor architecture. The basic specification of the pipeline is also listed in the figure.

It will be apparent to those skilled in the art that various modifications can be made to this PMVCC algorithm and the related architecture of the instant invention without departing from the scope or spirit of the invention, and it is intended that the present invention cover modifications and variations of the PMVCC algorithm and related architecture provided they come in the scope of the appended claims and their equivalents. Furthermore, it will be appreciated that the many specificities provided herein are for the sake of explanation only, and not intended to limit the scope and reach of the invention.

The invention claimed is:

1. An integrated digital video apparatus comprising:
 a cover with a plurality of digital video cameras located thereon;
 said cameras being grouped into a plurality of processing groups, each of said cameras belonging to one of said processing groups;
 said processing groups including a control camera and one or more surrounding cameras;
 digital signal processors corresponding to said cameras;
 said control camera for each said processing group providing video representing an independent viewpoint, said one or more surrounding cameras in each processing group providing a corresponding number of dependent viewpoints surrounding said independent viewpoint; and a controller receiving the output of said digital signal processors for one of said processing groups, and applying a video coding scheme to only said independent viewpoint to provide a coded central image, and deriving prediction data on the images of said dependent viewpoints based on said coded central image.

2. The integrated digital video apparatus as set forth in claim 1, wherein said cameras are disposed centripetally with respect to said cover.

3. The integrated digital video apparatus as set forth in claim 2, wherein said cover has a dome shape.

4. The integrated digital video apparatus as set forth in claim 2, wherein said cover includes at least 146 said cameras.

5. The integrated digital video apparatus as set forth in claim 4, wherein said cameras operate synchronously and acquire real-time visual pictures at a rate of at least 20 frames per second.

6. The integrated digital video apparatus as set forth in claim 5, wherein said cameras acquire said real-time visual pictures at a rate of at least 30 frames per second.

7. The integrated digital video apparatus as set forth in claim 2, wherein said cover includes an interior layer, and intermediate layer, and an exterior layer.

8. The integrated digital video apparatus as set forth in claim 7, wherein said interior layer provides only one-way visibility from the outside of said cover to the inside.

9. The integrated digital video apparatus as set forth in claim 7, wherein said cameras are disposed in said intermediate layer.

10. The integrated digital video apparatus as set forth in claim 7, wherein said the exterior layer comprises a physical frame supporting said cameras and a module for transmitting captured video data outside said cover.

11. The integrated digital video apparatus as set forth in claim 1, wherein, in each said processing group, the output from said control camera is provided to said digital signal processor corresponding to said control camera and also to all of said digital signal processors corresponding to said one or more surrounding cameras, and the output from each said surrounding camera is provided to only said digital signal processor corresponding to said surrounding camera.

12. A method of video capture and compression, comprising:

providing a cover comprising a plurality of digital video cameras located thereon, each said camera being located at a defined viewpoint;

grouping said cameras into at least two processing groups, each said processing group having only one of said cameras as a control camera and the remainder of said cameras of said processing group being surrounding cameras;

providing digital signal processors corresponding to said cameras, wherein said surrounding cameras provide output to only a corresponding one of said digital signal processors, and said control camera provides output to said corresponding digital signal processors and also to said ones of said digital signal processors corresponding to said surrounding cameras;

providing respective digital video data from said cameras as said output to said digital signal processors, said output from said control camera representing an independent viewpoint, said surrounding cameras in each said processing group providing a corresponding number of dependent viewpoints surrounding said independent viewpoint; and applying a video coding scheme to only said independent viewpoint to provide a coded central image for said corresponding processing group, and deriving prediction data on the images of said dependent viewpoints based on said coded central image.

13. The method of video capture and compression as set forth in claim 12, wherein said step of providing said cover includes systematically choosing positions of said viewpoints for said cameras on said apparatus, comprising a coarse-to-fine, progressive scheme of paving an interior surface of said cover with said viewpoint positions for said cameras.

14. The method of video capture and compression as set forth in claim 13, wherein said step of calibrating comprises, for each camera:

determining current parameter values of said camera;

comparing said parameter values to standard values for said camera; and compensating for a difference between said current parameter values and said standard values.

15. The method of video capture and compression as set forth in claim 14, wherein said step of calibrating further comprises:

providing, for each camera, a captured frame size larger than an encoding and display frame size, a difference between the captured frame size and the encoding and display frame size determining a displacement margin;

providing said cameras at said viewpoints in said cover so that a maximum displacement of the optical center of each said camera from a center of interest is not greater than said displacement margin;

performing said compensating for said difference between said current parameter values and said standard values by taking into account said displacement margin during said applying of said video coding scheme.

16. The method of video capture and compression as set forth in claim 15, wherein said step of calibrating further comprises, for each camera, measuring angular differences between the Y-axis of said camera on the image plane and a standard Y direction defined as the image plane projection of the longitude passing said viewpoint for said camera.

17. The method of video capture and compression as set forth in claim 12, further comprising a step of calibrating said cameras.

18. The method of video capture and compression as set forth in claim 17, wherein said step of calibrating comprises, for each camera:

adjusting an optical center of said camera to be coincident with a center of interest, and recording the displacement between the two centers;

adjust a focal length for said camera with respect to said center of interest; and aligning the x-y coordinate system on the image plane to be coincident with a standard coordinate system.

19. The method of video capture and compression as set forth in claim 12, wherein said step of applying said video coding scheme is performed by said digital signal processors for said each group working in parallel.

20. The method of video capture and compression as set forth in claim 12, wherein said step of applying said video coding scheme is performed so that a video frame for a given one of said processing groups is output with a number of tiles corresponding to the number of cameras in said given processing group, each said digital signal processor corresponding to one of said surrounding cameras being responsible for coding of one of said tiles, said digital signal processor corresponding to said control camera being responsible for coding of two of said tiles.

21. The method of video capture and compression as set forth in claim 20, wherein said step of applying said video coding scheme further comprises, for said digital signal processors corresponding to said surrounding cameras:
when said video frame is an I-frame, processing only said corresponding one of said tiles; and
when said video frame is a P-frame, processing said corresponding one of said tiles and also a portion of adjacent ones of said tiles defining a surrounding margin.

22. The method of video capture and compression as set forth in claim 21, wherein said step of applying said video coding scheme further comprises, for said digital signal processor corresponding to said control camera:
when said video frame is an I-frame, processing only said corresponding two of said tiles; and
when said video frame is a P-frame, processing said corresponding two of said tiles and also a portion of adjacent ones of said tiles defining a surrounding margin.

23. The method of video capture and compression as set forth in claim 12, wherein said step of applying said video coding scheme further includes a step of encoding a video frame as an I-frame, comprising:
encoding said video frame received from said control camera, including:
decomposing said video frame received from said control camera into a number of equivalent, non-overlapping tiles, said number of said tiles being equal to the number of said cameras in said processing group;
sending two of said tiles to said digital signal processor corresponding to said control camera;
sending each of the remainder of said tiles to a corresponding one of the digital signal processors corresponding to said surrounding cameras; and
encoding said tiles, in parallel, with said digital signal processors corresponding to said processing group, using a still-image coding scheme, to provide as a processing group output a respective compressed tile relating to said video frame;
executing a feedback loop, including:
for all of said digital signal processors corresponding to said cameras in said processing group, decoding the respective compressed tile;
sending said decoded respective compressed tile, from each of said digital signal processors corresponding to said surrounding cameras, to said digital signal processor corresponding to said control camera;
at said digital signal processor corresponding to said control camera, assembling said decoded respective compressed tiles into a reconstructed video frame; and
broadcasting, to said digital signal processors corresponding to said surrounding cameras, said reconstructed video frame;
encoding video frames received from said surrounding cameras, including:
for each of said digital signal processors corresponding to said surrounding cameras, making a rotation and translation prediction for said video frame received from said surrounding camera based on said reconstructed video frame received from said digital signal processor corresponding to said control camera;
determining the difference between said video frame received from said surrounding camera and said rotation and translation prediction;
encoding said difference using a still-image coding algorithm to produce an encoded difference; and
sending said encoded difference for each of said digital signal processors corresponding to said surrounding cameras as part of said processing group output.

24. The method of video capture and compression as set forth in claim 12, wherein said step of applying said video coding scheme further includes a step of encoding a video frame as a P-frame, comprising:
encoding said video frame received from said control camera, including:
decomposing said video frame received from said control camera into a number of equivalent, non-overlapping tiles, said number of said tiles being equal to the number of said cameras in said processing group;
sending two of said tiles to said digital signal processor corresponding to said control camera;
sending each of the remainder of said tiles to a corresponding one of the digital signal processors corresponding to said surrounding cameras; and
encoding said tiles, in parallel, with said digital signal processors corresponding to said processing group, using a predicted-frame coding scheme, to provide as a processing group output a respective compressed tile relating to said video frame;
executing a feedback loop, including:
for all of said digital signal processors corresponding to said cameras in said processing group, decoding the respective compressed tile;
sending said decoded respective compressed tile, from each of said digital signal processors corresponding to said surrounding cameras, to said digital signal processor corresponding to said control camera;
at said digital signal processor corresponding to said control camera, assembling said decoded respective compressed tiles into a reconstructed video frame; and
broadcasting, to said digital signal processors corresponding to said surrounding cameras, said reconstructed video frame;
encoding video frames received from said surrounding cameras, including:
for each of said digital signal processors corresponding to said surrounding cameras, making a rotation and translation prediction for said video frame received from said surrounding camera based on said reconstructed video frame received from said digital signal processor corresponding to said control camera;
determining the difference between said video frame received from said surrounding camera and said rotation and translation prediction;
encoding said difference using a still-image coding algorithm to produce an encoded difference; and
sending said encoded difference for each of said digital signal processors corresponding to said surrounding cameras as part of said processing group output.

* * * * *